(12) United States Patent
Won

(10) Patent No.: US 8,396,217 B2
(45) Date of Patent: Mar. 12, 2013

(54) BROADCAST RECEIVING APPARATUS AND CHANNEL CHANGING METHOD THEREOF

(75) Inventor: Yong-Moon Won, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1344 days.

(21) Appl. No.: 11/407,089

(22) Filed: Apr. 20, 2006

(65) Prior Publication Data

US 2007/0030969 A1 Feb. 8, 2007

(30) Foreign Application Priority Data

Aug. 2, 2005 (KR) ........................ 10-2005-0070787

(51) Int. Cl.
*H04N 7/167* (2011.01)
*H04N 7/12* (2006.01)

(52) U.S. Cl. ...................... 380/239; 725/31; 725/146

(58) Field of Classification Search .............. 380/239; 725/31, 146

See application file for complete search history.

(56) References Cited

U.S. PATENT DOCUMENTS

| | | | | |
|---|---|---|---|---|
| 5,600,378 | A * | 2/1997 | Wasilewski | 348/468 |
| 6,223,347 | B1 * | 4/2001 | Watanabe et al. | 725/139 |
| 2001/0001024 | A1 * | 5/2001 | Yanagihara et al. | 386/75 |
| 2002/0001459 | A1 * | 1/2002 | Fujie et al. | 386/111 |
| 2002/0165983 | A1 * | 11/2002 | Gastaldi | 709/245 |
| 2003/0021587 | A1 * | 1/2003 | Sugimoto et al. | 386/95 |
| 2003/0233665 | A1 * | 12/2003 | Tsujino et al. | 725/134 |
| 2004/0143429 | A1 * | 7/2004 | Lee | 704/1 |
| 2004/0158641 | A1 * | 8/2004 | Poli et al. | 709/231 |
| 2004/0181813 | A1 * | 9/2004 | Ota et al. | 725/131 |
| 2005/0114890 | A1 * | 5/2005 | Mountain | 725/54 |
| 2005/0172314 | A1 * | 8/2005 | Krakora et al. | 725/38 |
| 2005/0180568 | A1 * | 8/2005 | Krause | 380/212 |
| 2005/0226417 | A1 * | 10/2005 | Kubota et al. | 380/228 |
| 2006/0143448 | A1 * | 6/2006 | Moroney | 713/166 |

FOREIGN PATENT DOCUMENTS

| | | |
|---|---|---|
| JP | 2000-013696 | 1/2000 |
| JP | 2001-016513 | 1/2001 |
| JP | 2001016513 A * | 1/2001 |
| JP | 2003-110954 | 4/2003 |
| JP | 2003-250134 | 5/2003 |
| JP | 2004-228850 | 8/2004 |

OTHER PUBLICATIONS

Yuzawa, Kazuyuki. Translation of JP 2001 16513, published 2001.*
Japanese Office Action issued on Aug. 25, 2009 in the corresponding Japanese Patent Application No. 2006-170064.
Japanese Appeal Response (Interrogation) dated Oct. 4, 2011 issued for corresponding Japanese Patent Application No. 2006-170064.

* cited by examiner

*Primary Examiner* — Michael Simitoski
(74) *Attorney, Agent, or Firm* — H.C. Park & Associates, PLC

(57) ABSTRACT

In a broadcast receiving apparatus and a channel changing method in a broadcast receiving apparatus, broadcast data corresponding to a selected broadcast program, included in a channel broadcast signal received as a result of broadcast program selection, is descrambled based on previously stored descrambling control information, thereby shortening scrambling time and reducing channel change time in the broadcast receiving apparatus.

11 Claims, 2 Drawing Sheets

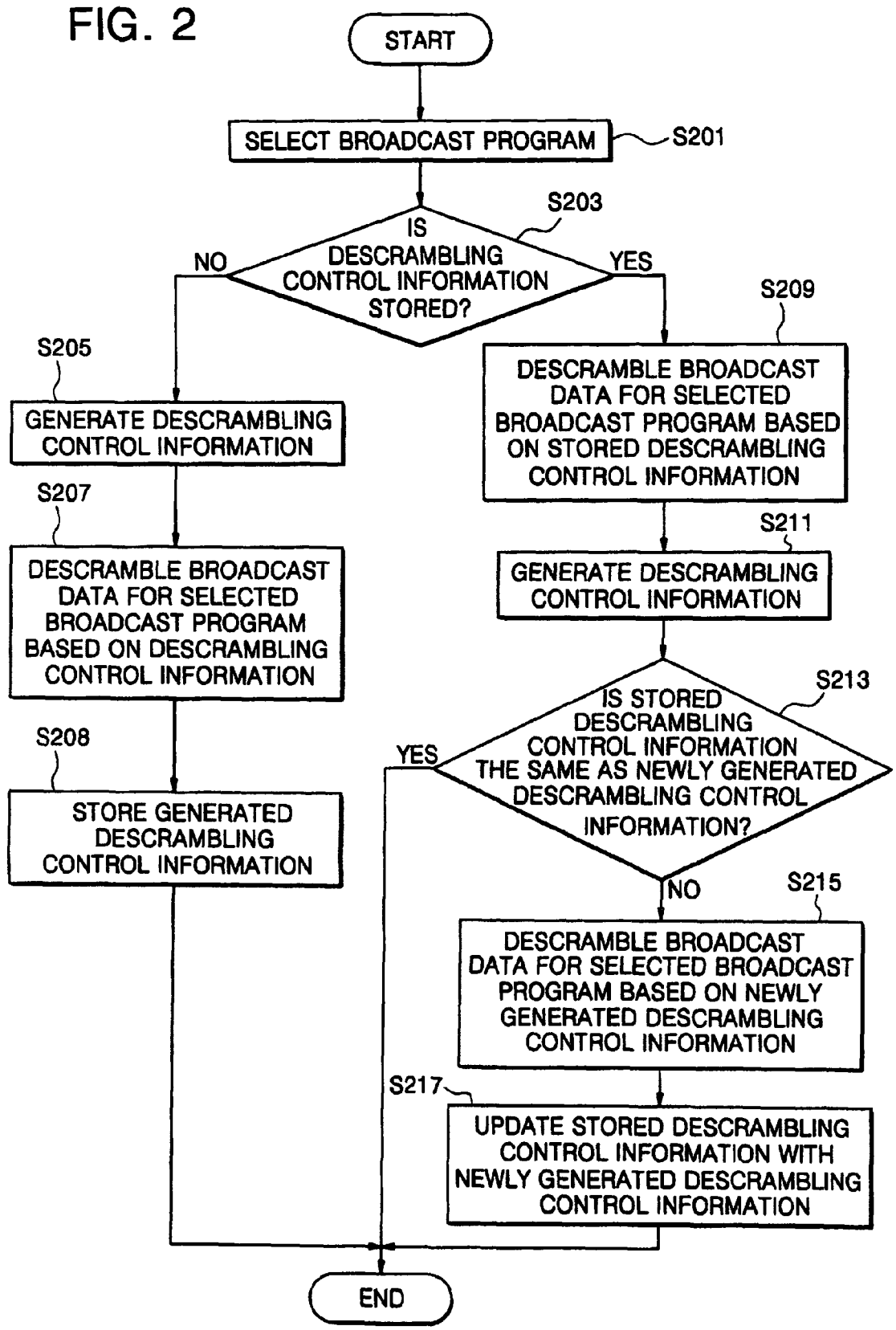

BROADCAST RECEIVING APPARATUS AND CHANNEL CHANGING METHOD THEREOF

CLAIM OF PRIORITY

This application makes reference to, incorporates the same herein, and claims all benefits accruing under 35 U.S.C. §119 from an application for BROADCASTING RECEIVING APPARATUS AND CHANNEL CHANGING METHOD THEREOF, filed in the Korean Intellectual Property Office on Aug. 2, 2005 and there duly allocated Serial No. 10-2005-0070787.

BACKGROUND OF THE INVENTION

1. Technical Field

The present invention relates to a broadcast receiving apparatus and a channel changing method in a broadcast receiving apparatus.

2. Related Art

In digital broadcasting using a set-top box, which is a broadcast receiving apparatus, program data on each channel is efficiently compressed according to for example a moving picture experts group (MPEG) coding standard, and programs corresponding to a plurality of channels are multiplexed based on digital modulation schemes for each transmission medium, and are transmitted.

Accordingly, the digital broadcasting system can broadcast several tens to hundreds of channels without using a number of repeaters, unlike an analog broadcasting system.

In other words, the digital broadcasting system greatly improves frequency use efficiency compared to the analog broadcasting system, thereby solving a problem of lack of broadcast channels.

In addition, the digital broadcasting system enables special pay broadcasting and plural use of bidirectional service broadcast software, and thus provides an opportunity for the broadcast industry to develop into a multimedia industry.

For these reasons, the digital broadcasting system has expanded from satellite broadcasting to cable and terrestrial broadcasting, and has been viewed as a next generation of broadcast technology.

However, the digital broadcasting system experiences a delay after channel selection due to digital broadcast signal processing, digital content protection, bidirectional application, and the like.

This phenomenon does not occur in the analog broadcast system, and makes digital broadcasting viewers uncomfortable. Digital cable broadcasting, digital terrestrial broadcasting and digital satellite broadcasting home to take such a long time upon channel selection, and it is known that digital cable broadcasting needs a longer channel selection time compared to other broadcast media.

The long channel selection time in the digital broadcasting system is caused by the tuning time for identifying physical channels, a process for determining whether channel reception is restricted to protect content, and a decoding process for logical channel identification.

In particular, in the process for determining whether channel reception is restricted to protect the content, when a selected broadcast program needs to be descrambled, broadcast data has to be descrambled. The broadcast data relates to the broadcast program selected by a user from the totality of broadcast data received from a broadcasting providing apparatus.

The broadcast data is descrambled according to descrambling control information generated by parsing program association table (PAT)/program map table (PMT) information included in a received channel broadcast signal.

However, whenever a user selects a broadcast program, a large amount of time is consumed in generating descrambling control information for the selected broadcast program, and thus much time is consumed in channel selection.

SUMMARY OF THE INVENTION

It is an object of the present invention to provide a broadcast receiving apparatus which descrambles broadcast data according to previously stored descrambling control information, and a channel changing method in the broadcast receiving apparatus, the broadcast data corresponding to a broadcast program included in a channel broadcast signal received by broadcast program selection.

According to an exemplary embodiment of the present invention, a broadcast receiving apparatus comprises a controller for descrambling broadcasting data according to previously stored descrambling control information, the broadcast data corresponding to a selected broadcast program included in a channel broadcast signal received as a result of broadcast program selection.

The descrambling control information preferably includes at least one of an audio packet identifier (PID) which is location information of audio data about the selected broadcast program among the broadcast data included in the channel broadcast signal, and a video PID which is location information of video data.

The controller preferably parses PAT/PMT information included in the received channel broadcast signal, generates descrambling control information for the selected broadcast program using the PAT/PMT information, compares the previously stored descrambling control information with the newly generated descrambling control information, descrambles the corresponding broadcast data according to the newly generated descrambling control information when the descrambling control information is different, and updates the previously stored descrambling control information with the newly generated descrambling control information.

When the descrambling control information for the selected broadcast program is not previously stored, the controller preferably parses the PAT/PMT information included in the received channel broadcast signal, generates descrambling control information for the selected program using the PAT/PMT information, descrambles the corresponding broadcast data according to the generated descrambling control information, and stores the generated descrambling control information.

The controller preferably includes a storage unit and a descramble controller. The storage unit stores descrambling control information to identify broadcast data for a selected broadcast program from the broadcast data for at least one other broadcast program. The descramble controller determines whether the descrambling control information for the selected broadcast program has been previously stored. When the descrambling control information has been previously stored, the descramble controller descrambles the broadcast data corresponding to the selected broadcast program among received broadcast data according to the previously stored descrambling control information, parses PAT/PMT information included in a received channel broadcast signal, generates the descrambling control information for the selected broadcast program using the PAT/PMT information, compares the previously stored descrambling control information with the newly generated descrambling control information, descrambles the corresponding broadcast data according to the newly generated descrambling control information when the descrambling control information is different, and updates the previously stored descrambling control information with the newly generated descrambling control information. On the other hand, when the descrambling control information has not been previously stored, the descramble controller parses the PAT/PMT information included in the received channel broadcast signal, generates descrambling control information for the selected broadcast program using the PAT/PMT information, descrambles the corresponding broadcast data according to the generated descrambling control information, and stores the generated descrambling control information.

According to another exemplary embodiment of the present invention, a broadcast receiving apparatus comprises a storage unit and a descramble controller. The storage unit stores descrambling control information to identify broadcast data for a selected broadcast program from broadcast data for at least one other broadcast program. The descramble controller determines whether the descrambling control information for the selected broadcast program has been previously stored. When the descrambling control information has been previously stored, the descramble controller descrambles the broadcast data corresponding to the selected broadcast program from received broadcast data according to the previously stored descrambling control information. On the other hand, when the descrambling control information has not been previously stored, the descramble controller parses PAT/PMT information included in a received channel broadcast signal, generates descrambling control information for the selected broadcast program using the PAT/PMT information, descrambles the corresponding broadcast data according to the generated descrambling control information, and stores the generated descrambling control information.

According to yet another exemplary embodiment of the present invention, a channel changing method in a broadcast receiving apparatus, which includes a database storing descrambling control information, comprises the steps of: determining whether descrambling control information corresponding to a selected broadcast program included in a channel broadcast signal received by broadcast program selection is stored; and descrambling broadcast data corresponding to the selected broadcast program from broadcast data included in the channel broadcast signal according to the stored descrambling control information when the descrambling control information corresponding to the selected broadcast program is stored.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 2 is a flowchart illustrating a channel changing method in a broadcast receiving apparatus according to an exemplary embodiment of the present invention.

DETAILED DESCRIPTION OF THE INVENTION

Figure 1:
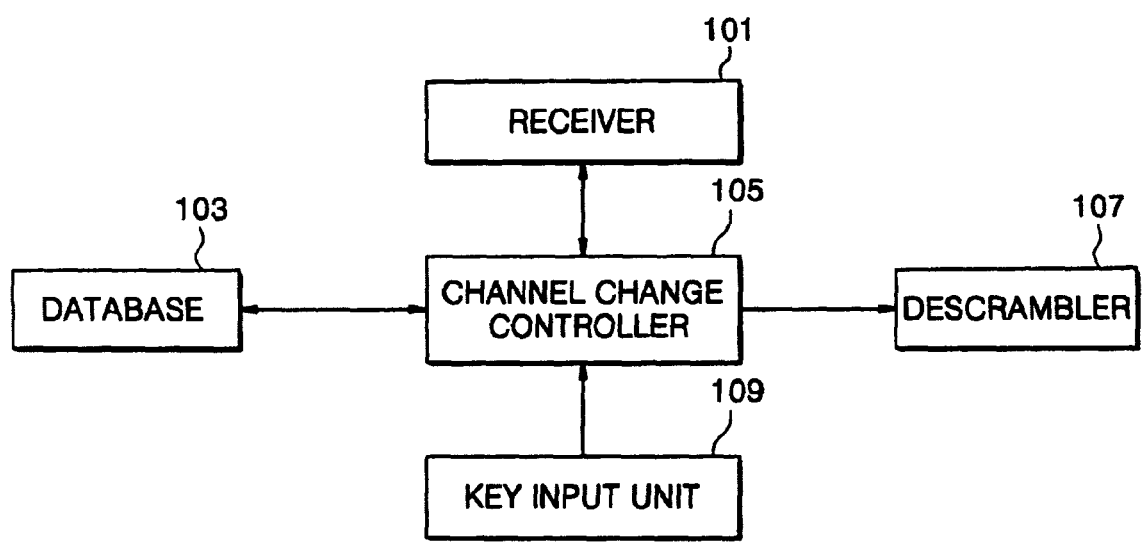
FIG. 1 is a block diagram of a broadcast receiving apparatus according to an exemplary embodiment of the present invention.

Hereinafter, exemplary embodiments of the present invention will be described in detail with reference to the accompanying drawings. Matters related to the present invention and well known in the art will not be described in detail when such description would detract from the clarity and conciseness of the disclosure.

FIG. 1 is a block diagram of a broadcast receiving apparatus according to an exemplary embodiment of the present invention.

As shown in FIG. 1, the broadcast receiving apparatus according to the present invention comprises a receiver 101, a database 103, a channel change controller 105, a descrambler 107, and a key input unit 109. The broadcast receiving apparatus may be a set-top box.

The key input unit 109 has at least one key, including a program selection key and the like. When a user selects a broadcast program, the key input unit 109 generates a broadcast program selection signal to designate the selected broadcast program, and sends the signal to the channel change controller 105.

The channel change controller 105 controls the receiver 101 to receive a channel broadcast signal for the selected broadcast program corresponding to the broadcast program selection signal received from the key input unit 109. Thus, the receiver 101 tunes the channel broadcast signal for the selected broadcast program.

The channel broadcast signal includes program association table (PAT)/program map table (PMT) information, descrambling information, (i.e., information as to whether broadcast data for each broadcast program scrambled according to the user's authority to view at least one broadcast program is descrambled), and broadcast data including content information such as video and audio information. In addition, the channel broadcast signal is tuned through one physical channel.

The receiver 101 sends the PAT/PMT information in the tuned channel broadcast signal to the channel change controller 105, and the descrambling information and the broadcast data are sent to the descrambler 107.

The PAT includes a PMT packet identifier (PID), which is PMT location information of each broadcast program, in the channel broadcast signal.

The PMT includes an audio PID which is location information of audio data of each broadcast program, a video PID which is location information of video data of each broadcast program, and the like, in the broadcast data.

The channel change controller 105 parses the PAT/PMT information included in the received channel broadcast signal, and generates descrambling control information for the broadcast program selected by the user.

In the latter regard, the descrambling control information for the selected broadcast program includes an audio PID and a video PID, the audio PID and video PID being location information of audio data and video data, respectively, in the selected broadcast program included in the channel broadcast signal.

The channel change controller 105 sends the generated descrambling control information to the descrambler 107.

Upon receiving the broadcast program selection signal from key input unit 109, the channel change controller 105 determines whether there is descrambling control information for the selected broadcast program in the database 103.

When there is descrambling control information for the selected broadcast program in the database 103, the channel change controller 105 sends the descrambling control information to the descrambler 107.

The channel change controller 105 compares the descrambling control information for the selected broadcast program previously stored in the database to the newly generated descrambling control information for the selected broadcast program.

When the previously stored descrambling control information is different from the newly generated descrambling control information, the channel change controller 105 stores the newly generated descrambling control information in the database 103 so as to update the information, and sends the newly generated descrambling control information to the descrambler 107.

The database 103 stores descrambling control information for at least one broadcast program.

The descrambler 107 recognizes location information of video data, audio data, and the like using the descrambling control information received from the channel change controller 105, the location information corresponding to the selected broadcast program included in the scrambled broadcast data received from the receiver 101.

The descrambler 107 determines whether the selected broadcast program is to be descrambled based on the descrambling information received from the receiver 101.

When the selected broadcast program is to be descrambled, the descrambler 107 descrambles the video data, the audio data, and the like of the recognized location based on the descrambling control information included in the broadcast data received from the receiver 101.

Operation of the broadcast receiving apparatus of the present invention shown in FIG. 1 will now be described.

When a user selects a broadcast program, the key input unit 109 generates a broadcast program selection signal to select the selected broadcast program, and sends the signal to the channel change controller 105.

The channel change controller 105 controls the receiver 101 to receive a channel broadcast signal for the selected broadcast program corresponding to the broadcast program selection signal received from the key input unit 109.

The receiver 101 tunes the channel broadcast signal for the selected broadcast program.

The receiver 101 sends the PAT/PMT information included in the tuned channel broadcast signal to the channel change controller 105, and descrambling information and broadcast data are sent to the descrambler 107.

The channel change controller 105 parses PAT/PMT information included in the received channel broadcast signal, and generates descrambling control information for the broadcast program selected by the user.

The channel change controller 105 sends the generated descrambling control information to the descrambler 107. The channel change controller 105 also stores the generated descrambling control information in the database 103.

When the selected broadcast program is to be descrambled, the descrambler 107 descrambles video data, audio data, and the like of a recognized location based on the descrambling control information included in the broadcast data received from the receiver 101.

As mentioned above, when a user selects a broadcast program, the key input unit 109 generates a broadcast program selection signal to select the selected broadcast program, and sends the signal to the channel change controller 105.

Upon receiving the broadcast program selection signal from the key input unit 109, the channel change controller 105 determines whether descrambling control information for the selected broadcast program has been previously stored in the database 103.

When the descrambling control information for the selected broadcast program has been previously stored in the database 103, the channel change controller 105 sends the descrambling control information to the descrambler 107.

The channel change controller 105 controls the receiver 101 to receive a channel broadcast signal of the selected broadcast program corresponding to the broadcast program selection signal received from the key input unit 109.

The receiver 101 tunes the channel broadcast signal of the selected broadcast program.

The receiver 101 sends PAT/PMT information, included in the tuned channel broadcast signal, to the channel change controller 105, and the descrambling information and broadcast data are sent to the descrambler 107.

The channel change controller 105 parses the PAT/PMT information included in the received channel broadcast signal, and generates descrambling control information for the broadcast program selected by the user.

When the descrambling control information for the selected broadcast program is not stored in the database 103, the channel change controller 105 sends the generated descrambling control information to the descrambler 107, and stores the generated descrambling control information in the database 103.

When the descrambling control information for the selected broadcast program is previously stored in the database 103, the channel change controller 105 compares the descrambling control information previously stored in the database 103 to the newly generated descrambling control information.

When the previously stored descrambling control information is different from the newly generated descrambling control information, the channel change controller 105 stores the newly generated descrambling control information in the database 103 so as to update the information, and sends the newly generated descrambling control information to the descrambler 107.

The descrambler 107 recognizes location information of video data and audio data using the descrambling control information received from the channel change controller 105, the location information corresponding to the selected broadcast program included in the scrambled broadcast data received from the receiver 101.

The descrambler 107 determines whether the selected broadcast program is to be descrambled based on the descrambling information received from the receiver 101.

When the selected broadcast program is to be descrambled, the descrambler 107 descrambles the video data, the audio data, and the like of the recognized location using the descrambling control information included in the broadcast data received from the receiver 101.

FIG. 2 is a flowchart illustrating a channel changing method in a broadcast receiving apparatus according to an exemplary embodiment of the present invention.

As shown in FIG. 2, a user selects a broadcast program to view using the broadcast receiving apparatus (S201).

The broadcast receiving apparatus determines whether descrambling control information for the selected broadcast program has been previously stored therein (S203).

The descrambling control information for the selected broadcast program includes an audio PID (i.e., location information of audio data for the selected broadcast program) and a video PID (i.e., location information of video data for the same) from the broadcast data included in the channel broadcast signal.

The channel broadcast signal includes PAT/PMT information, descrambling information (i.e., information related to whether broadcast data for each broadcast program, scrambled according to the user's authority for viewing at least one broadcast program, is descrambled), and the broadcast data including content information, such as video and audio information. In addition, the channel broadcast signal is tuned by means of one physical channel.

The PAT includes a PMT PID, which is PMT location information for each broadcast program, in the channel broadcast signal.

The PMT includes an audio PID which is location information of audio data for each broadcast program, a video PID which is location information of video data for each broadcast program, and the like, in the broadcast data.

When the descrambling control information for the selected broadcast program has not been previously stored, the broadcast receiving apparatus tunes the channel broadcast signal for the selected broadcast program, parses the PAT/PMT information included in the tuned channel broadcast signal, and generates descrambling control information corresponding to the broadcast program selected by the user (S205).

The broadcast receiving apparatus descrambles the video data, the audio data, and the like corresponding to the selected broadcast program from the broadcast data included in the channel broadcast signal according to the descrambling control information (S207).

The broadcast receiving apparatus stores the generated descrambling control information (S208).

On the other hand, when the descrambling control information for the selected broadcast program has been previously stored, the broadcast receiving apparatus descrambles the video data, the audio data, and the like corresponding to the selected broadcast program from the broadcast data included in the channel broadcast signal according to the previously stored descrambling control information (S209).

The broadcast receiving apparatus then tunes the channel broadcast signal for the selected broadcast program, parses the PAT/PMT information included in the tuned channel broadcast signal, and generates descrambling control information for the broadcast program selected by the user (S211).

The broadcast receiving apparatus determines whether the previously stored descrambling control information is the same as the newly generated descrambling control information (S213).

The broadcast receiving apparatus then completes its control when the previously stored descrambling control information is the same as the newly generated descrambling control information. On the other hand, the broadcast receiving apparatus descrambles the video data, the audio data, and the like corresponding to the selected broadcast program according to the newly generated descrambling control information when the previously stored descrambling control information is different from the newly generated descrambling control information (S215).

The broadcast receiving apparatus then updates the previously stored descrambling control information with the newly generated descrambling control information (S217).

As described above, with the broadcast receiving apparatus and the channel changing method in the broadcast receiving apparatus according to the present invention, broadcast data corresponding to a selected broadcast program, included in a channel broadcast signal received as a result of broadcast program selection, is descrambled based on previously stored descrambling control information, thereby shortening descrambling time and reducing the time for selection of channels in the broadcast receiving apparatus.

While the present invention has been described with reference to exemplary embodiments thereof, it will be understood by those skilled in the art that various changes in form and detail may be made therein without departing from the scope of the present invention as defined by the following claims.

What is claimed is:

1. A broadcast receiving apparatus, comprising:
   a controller to receive a broadcast program selection signal corresponding to a selected broadcast program, to control a receiver to be tuned to a channel broadcast signal based on the selected broadcast program, and to determine whether a first descrambling control information corresponding to the selected broadcast program is stored in response to receiving the broadcast program selection signal; and
   a descrambler to descramble broadcast data according to at least one of the first descrambling control information and a second descrambling control information, the broadcast data corresponding to the selected broadcast program;
   wherein, in response to a determination that the first descrambling control information corresponding to the selected broadcast program is stored, the controller is configured to:
      control the descrambler to descramble the broadcast data corresponding to the selected broadcast program according to the stored first descrambling control information;
      generate second descrambling control information corresponding to the selected broadcast program using program association table (PAT)/program map table (PMT) information included in the received channel broadcast signal;
      compare the stored first descrambling control information to the generated second descrambling control information; and
      update the first descrambling control information with the second descrambling control information;
   wherein the descrambler receives location information of audio data and video data associated with the selected broadcast program from the controller and the receiver, and
   wherein the controller is not the same as the receiver.

2. The apparatus of claim 1, wherein the first descrambling control information and the second descrambling control information each comprise at least one of an audio packet identifier (PID) comprising the location information of the audio data for the selected broadcast program included in the channel broadcast signal, and a video PID comprising the location information of the video data for the selected broadcast program included in the channel broadcast signal.

3. The apparatus of claim 1, wherein the controller is configured to:
   parse the program association table (PAT)/program map table (PMT) information included in the received channel broadcast signal;
   generate the second descrambling control information for the selected broadcast program by using the PAT/PMT information; and
   control the descrambler to descramble corresponding broadcast data according to the generated second descrambling control information in response to a determination that the stored first descrambling control information is different from the generated second descrambling control information.

4. The apparatus of claim 1, wherein, in response to a determination that descrambling control information for the selected broadcast program is not stored, the controller is configured to:

parse program association table (PAT)/program map table (PMT) information included in the received channel broadcast signal;
generate second descrambling control information for the selected broadcast program using the PAT/PMT information;
control the descrambler to descramble the corresponding broadcast data according to the generated second descrambling control information; and
store the generated second descrambling control information.

5. The apparatus of claim 1, wherein the apparatus further comprises:
a storage unit to store at least one of the first descrambling control information and the second descrambling control information so as to identify the broadcast data corresponding to the selected broadcast program from among broadcast data corresponding to at least one additional broadcast program,
wherein, in response to a determination that the first descrambling control information corresponding to the selected broadcast program is stored, the controller is configured to:
control the descrambler to descramble the broadcast data corresponding to the selected broadcast program according to the stored first descrambling control information;
parse program association table (PAT)/program map table (PMT) information included in the received channel broadcast signal;
generate second descrambling control information corresponding to the selected broadcast program using the PAT/PMT information;
control the descrambler to descramble the corresponding broadcast data according to the generated second descrambling control information in response to a determination that the stored first descrambling control information is different from the generated second descrambling control information; and
wherein, in response to a determination that descrambling control information for the selected broadcast program is not stored, the controller is configured to:
parse the PAT/PMT information included in the received channel broadcast signal;
generate the second descrambling control information corresponding to the selected broadcast program using the PAT/PMT information;
control the descrambler to descramble the corresponding broadcast data according to the generated second descrambling control information; and
control the storage unit to store the generated second descrambling control information.

6. A broadcast receiving apparatus, comprising:
a storage unit to store at least one of first descrambling control information and second descrambling control information so as to identify broadcast data corresponding to a selected broadcast program from among broadcast data corresponding to at least one additional broadcast program; and
a controller to receive a broadcast program selection signal corresponding to the selected broadcast program, to control a receiver to be tuned to a channel broadcast signal based on the selected broadcast program, to determine whether first descrambling control information corresponding to the selected broadcast program is stored in the storage unit in response to receiving the broadcast program selection signal,
wherein, in response to a determination that the first descrambling control information is stored, the controller is configured to:
receive the stored first descrambling control information from the storage unit;
control a descrambler to descramble the broadcast data corresponding to the selected broadcast program according to the stored first descrambling control information;
generate second descrambling control information corresponding to the selected broadcast program using program association table (PAT)/program map table (PMT) information included in the received channel broadcast signal;
compare the stored first descrambling control information to the generated second descrambling control information; and
control the storage unit to update the stored first descrambling control information with the second descrambling control information;
wherein, in response to a determination that the first descrambling control information is not stored, the controller is configured to:
parse the program association table (PAT)/program map table (PMT) information included in the received channel broadcast signal;
generate the second descrambling control information corresponding to the selected broadcast program using the PAT/PMT information;
control the descrambler to descramble the corresponding broadcast data according to the generated second descrambling control information; and
control the storage unit to store the generated second descrambling control information,
wherein the descrambler receives location information of audio data and video data associated with the selected broadcast program from the controller and the receiver, and
wherein the controller is not the same as the receiver.

7. The apparatus of claim 6, wherein, in response to the determination that the first descrambling control information corresponding to the selected broadcast program is stored, the controller is further configured to:
parse the PAT/PMT information included in the received channel broadcast signal;
generate the second descrambling control information corresponding to the selected broadcast program using the PAT/PMT information;
control the descrambler to descramble the corresponding broadcast data according to the generated second descrambling control information in response to a determination that the stored first descrambling control information is different from the generated second descrambling control information.

8. A channel changing method in a broadcast receiving apparatus that comprises a database to store descrambling control information, the method comprising:
receiving a broadcast program selection signal corresponding to a selected broadcast program;
tuning a receiver to receive a channel broadcast signal based on the selected broadcast program;
determining, by a controller, whether first descrambling control information corresponding to the selected broadcast program is stored in the database in response to receiving the broadcast program selection signal;

controlling a descrambler to descramble the broadcast data corresponding to the selected broadcast program according to the stored first descrambling control information;

generating, in response to the controlling, second descrambling control information corresponding to the selected broadcast program using program association table (PAT)/program map table (PMT) information included in the received channel broadcast signal;

comparing the stored first descrambling control information to the generated second descrambling control information; and updating the first descrambling control information stored in the database with second descrambling control information newly generated by using program association table (PAT)/program map table (PMT) information included in the channel broadcast signal in response to a determination that the first descrambling control information is not the same as the second descrambling control information, wherein the descrambler receives location information of audio data and video data associated with the selected broadcast program from the receiver and the controller; and wherein the controller is not the same as the receiver.

9. The method of claim 8, wherein the first descrambling control information and the second descrambling control information each comprise at least one of an audio packet identifier (PID) comprising the location information of the audio data for the selected broadcast program included in the channel broadcast signal, and a video PID comprising the location information of the video data for the selected broadcast program among the broadcast data included in the channel broadcast signal.

10. The method of claim 8, wherein descrambling the broadcast data corresponding to the selected broadcast program from among the broadcast data included in the channel broadcast signal according to the stored first descrambling control information comprises:

parsing the program association table (PAT)/program map table (PMT) information included in the received channel broadcast signal;

generating the second descrambling control information corresponding to the selected broadcast program using the PAT/PMT information;

descrambling the corresponding broadcast data according to the generated second descrambling control information in response to a determination that the stored first descrambling control information is different from the generated second descrambling control information.

11. The method of claim 8, further comprising, in response to a determination that the first descrambling control information corresponding to the selected broadcast program is not stored:

parsing the program association table (PAT)/program map table (PMT) information included in the received channel broadcast signal;

generating the second descrambling control information corresponding to the selected broadcast program using the PAT/PMT information;

descrambling the corresponding broadcast data according to the generated second descrambling control information; and storing the generated second descrambling control information.

* * * * *

UNITED STATES PATENT AND TRADEMARK OFFICE
CERTIFICATE OF CORRECTION

| | | |
|---|---|---|
| PATENT NO. | : 8,396,217 B2 | Page 1 of 1 |
| APPLICATION NO. | : 11/407089 | |
| DATED | : March 12, 2013 | |
| INVENTOR(S) | : Yong-Moon Won | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1460 days.

Signed and Sealed this
Second Day of December, 2014

Michelle K. Lee
*Deputy Director of the United States Patent and Trademark Office*